US006632286B2

(12) United States Patent
Converse

(10) Patent No.: US 6,632,286 B2
(45) Date of Patent: Oct. 14, 2003

(54) CROSS-FLOW PROCESS FOR THE PRODUCTION OF DECOMPOSABLE SOLUBLE PRODUCTS FROM A SLURRY OF SOLIDS

(75) Inventor: Alvin Omar Converse, Norwich, VT (US)

(73) Assignee: Trustees of Dartmouth College, Hanover, NH (US)

( * ) Notice: Subject to any disclaimer, the term of this patent is extended or adjusted under 35 U.S.C. 154(b) by 332 days.

(21) Appl. No.: 09/810,127

(22) Filed: Mar. 19, 2001

(65) Prior Publication Data

US 2002/0173619 A1 Nov. 21, 2002

(51) Int. Cl.[7] .............................. C13K 1/02; B01J 8/20; B01J 8/21

(52) U.S. Cl. .............................. 127/37; 127/1; 137/806

(58) Field of Search ........................ 127/1, 37; 137/806

(56) References Cited

U.S. PATENT DOCUMENTS

| | | | | |
|---|---|---|---|---|
| 4,237,226 A | | 12/1980 | Grethlein | |
| 4,316,748 A | * | 2/1982 | Rugg et al. | 127/37 |
| 4,556,430 A | | 12/1985 | Converse et al. | |
| 4,615,742 A | | 10/1986 | Wright et al. | |
| 4,818,295 A | | 4/1989 | Converse et al. | |
| 5,424,417 A | | 6/1995 | Torget et al. | |
| 5,503,996 A | | 4/1996 | Torget et al. | |
| 5,705,369 A | | 1/1998 | Torget et al. | |
| 6,022,419 A | | 2/2000 | Torget et al. | |

FOREIGN PATENT DOCUMENTS

DE 3225074 A 12/1984

OTHER PUBLICATIONS

Katzen, R. "Biomass Ethanol Commercialization in the Western Hemisphere," ISAF XIII Int'l Symp. on Alcohol Fuels, Stockholm, Sweden, (Jul. 3–7, 2000).

Petterson et al. "Modelling and Simulation of a Counter current Shrinking Bed Reactor for Dilute Acid Hydrolysis of Cellulose," 22nd Symp. on Biotech. for Fuels and Chemicals, Gatlinburg, TN. (May 7–11, 2000.) Poster 3–48.

Lee, Y.Y. et al., "Modelling of Counter Current Shrinking Bed Reactor in Dilute Acid Total–Hydrolysis of Lignocellulose Biomass," Biores. Technol. 71, (2000) No month provided 29–39.

Torget, R.W. et al., "Fundamental Aspects of Dilute Acid Hydrolysis/Fractionation Kinetics of Hardwood Carbohydrates, 1, Cellulose Hydrolysis," Ind. Eng. Chem. Res. 39 (2000) No month provided 2817–2825.

Converse, A.O., "Simulation of a Cross–Flow Shrinking Bed Reactor for the Hydrolysis of Lignocellulosics," unpublished manuscript. No date applicable.

* cited by examiner

*Primary Examiner*—David Brunsman

(57) ABSTRACT

A process is described for the production of decomposable soluble products from a slurry of solids in which the slurry is convey axially through the reactor and excess liquid is removed radially through the walls of the reactor. The primary example is the hydrolysis of lignocellulosic biomass to form sugars, usually using an acid catalyst. In one variation of the process liquid and possibly steam are added through the inner wall of the reactor to provide additional flow in the radial direction and to control the temperature. Pressures are maintained such that the product stream is thermally quenched due to partial flashing as it leaves the reactor.

17 Claims, 2 Drawing Sheets

CROSS-FLOW PROCESS FOR THE PRODUCTION OF DECOMPOSABLE SOLUBLE PRODUCTS FROM A SLURRY OF SOLIDS

STATEMENT REGARDING FEDERALLY SPONSORED RESEARCH OR DEVELOPMENT

This patent application is not the direct outgrowth of federally sponsored research.

BACKGROUND OF THE INVENTION

The invention is in the field of chemical reactor design, applied to the conversion of a solid (usually in the form of a slurry) to soluble products, which are subject to decomposition. The objective of the design is to obtain high conversion of the solids while maintaining low decomposition of the soluble product(s). Of particular interest in this application is the hydrolysis of cellulose and hemicellulose in the solid to form sugars. The solid may be a form of biomass, such as wood, or a product derived from biomass, such as paper. The cellulose and hemicellulose in biomass can be hydrolyzed using an acid or base catalyst to form sugars, which are soluble and subject to decomposition. In some cases it is desired to convert the hemicellulose while leaving the cellulose largely untouched, so that the cellulose can be subsequently converted to sugars using enzyme catalysts. This partial hydrolysis is often referred to as pretreatment or prehydrolysis.

Many reactor configurations have been considered in the published literature for the hydrolysis of biomass to sugars. The U.S. WWII effort to build a commercial reactor used a percolation reactor (Katzen, ISAF XIII, International Symposium on Alcohol Fuels Stockholm, Sweden, Jul. 3–7, 2000)[1] in which an acid solution was applied to a bed of wood chips, and the sugar containing solution was withdrawn from the bottom of the reactor. Recently this type of reactor has been referred to as a 'flow-through' reactor since the liquid flows through a bed of solids.

[1] These refer to the citation numbers given in the Information Disclosure forms.

Grethlein, U.S. Pat. No. 4,237,226[2], discloses the use of a continuous co-current plug-flow reactor for the pre-hydrolysis of biomass.

Converse et al., U.S. Pat. No. 4,556,430[3], discloses the use of a non-aqueous immiscible carrier fluid in a continuous plug flow reactor in order to convey the solids and, at the same time, increase the sugar concentration in the aqueous phase.

Wright et al., U.S. Pat. No. 4,615,742[4] discloses the use of a series of fixed-bed flow-through reactors in which the liquid flow is switched so as to approximate counter-current flow.

Converse et al., U.S. Pat. No. 4,818,295[5] discloses the use of a cyclone reactor in order to obtain counter-current flow between the solids and the liquid.

None of the above patents, and many others that teach methods of hydrolyzing cellulose and hemicellulose, make use of a cross-flow pattern. The patents referenced in this paragraph do speak of cross-current flow pattern. Torget et al., U.S. Pat. Nos. 5,424,417[6]; 5,503,996[7]; and 5,705,369[8] discloses the use of a flow-through reactor for the prehydrolysis if lignocellulosic material. Specific to the current application the patent states. "the lignocellulose solids may be stationary, travel in a counter-current or cross-current fashion. . . . One can perform a solid-liquid separation in the flow-through system by using a screw-like device to cause the separation continuously during or at the end of prehydrolysis. Important to the process is the movement and removal of fluid during the prehydrolysis to separate soluble products as they are released from the solid lignocellulosic residue." (col. 6, lines 47–57, U.S. Pat. No. 5,503,996)[7]Furthermore it states: "such a reactor would have lignocellulosic material driven through the reactor while fluid is passed through the material, typically in a counter-current or cross-current manner. . . . Alternatively, the lignocellulosic substrate may be driven laterally while fluid is applied on top and allowed to percolate down to be removed at the bottom." (col. 6, line 66–col. 7, line 10, U.S. Pat. No. 5,503,996)[7] The same statement can be found in the other two patents cited above, as well. O. Bobleter and H. Binder, German Patent No. DE 3225074[14], include, without comment on implimentation, the crossflow of water to solubilize and remove hemicellulose and portions of the lignin; it does not include the use of an acid catalyst nor the conversion of cellulose.

The current application uses these principles but differs from the patents cited above in the following aspects: 1) a unique geometry for effecting cross flow is described, 2) it is not limited to prehydrolysis, and 3) a computer simulation, employing cross-flow reactor Recently the desirability of forcible expression of the liquid in a so-called 'shrinking-bed' reactor has been analyzed and demonstrated (Pettersson et al., 22nd Symp. on biotech, for fuels and chemicals, Gatlinburg, Tenn. May 7–11, 2000 Poster 3–48[9]; Lee et al, Biores. Tech. 71, 29–39, 2000[10]; Torget et al., Ind. Eng. Chem. Res., 39, 2817–2815, 2000[11]).

Torget et al., U.S. Pat. No. 6,022,419[12], discloses the use of a continous shrinking-bed flow-through reactor for the hydrolysis and fractionation of lignocellulosic biomass. The patent states that "the invention consists of a series co-current, counter-current or single pass, isolated stages . . . " No mention is made of cross-current flow or withdrawal of the excess liquid in the radical direction.

BRIEF SUMMARY OF THE INVENTION

The present invention is a reactor system for converting solids to soluble products which are subject to decomposition. An example is the conversion of biomass to such products, and includes the conversion of hemicellulosic, cellulosic and lignocellulosic substances to sugars. The term biomass, as used herein, means substances that are produced by photosynthesis, and includes hemicellulosic, cellulosic and lignocellulosic substances, both natural and processed, as well as natural or manufactured organic materials more broadly. Emphasis in the following discussion is placed on producing sugars for biomass, but the invention is broader, and is applicable to the conversion of any solid to liquid products which themselves are subject to decomposition.

The essence of the invention is that liquid, containing products from the reacting solids, is squeezed from the slurry by a compressive force and removed from the reacting zone by passage through an outer porous wall. This is done in order to minimize the residence time of the soluble products in the reactor, and thereby, minimize their decomposition. The liquid product stream may be thermally or chemically quenched as it is withdrawn to prevent further chemical reaction. The direction in which the exiting liquid moves is approximately perpendicular to the direction in which the slurry moves.

Liquid, possibly containing acid or base, may, or may not, be admitted into the reactor through the porous wall of the inner tube to aid in the washing of soluble product through the outer wall of the reactor. This liquid may assist in the temperature control of the reacting solids and may be mixed with steam. It may also contain chemicals such as a mineral acid to affect the reaction.

DETAILED DESCRIPTION OF THE INVENTION

Figure 1:
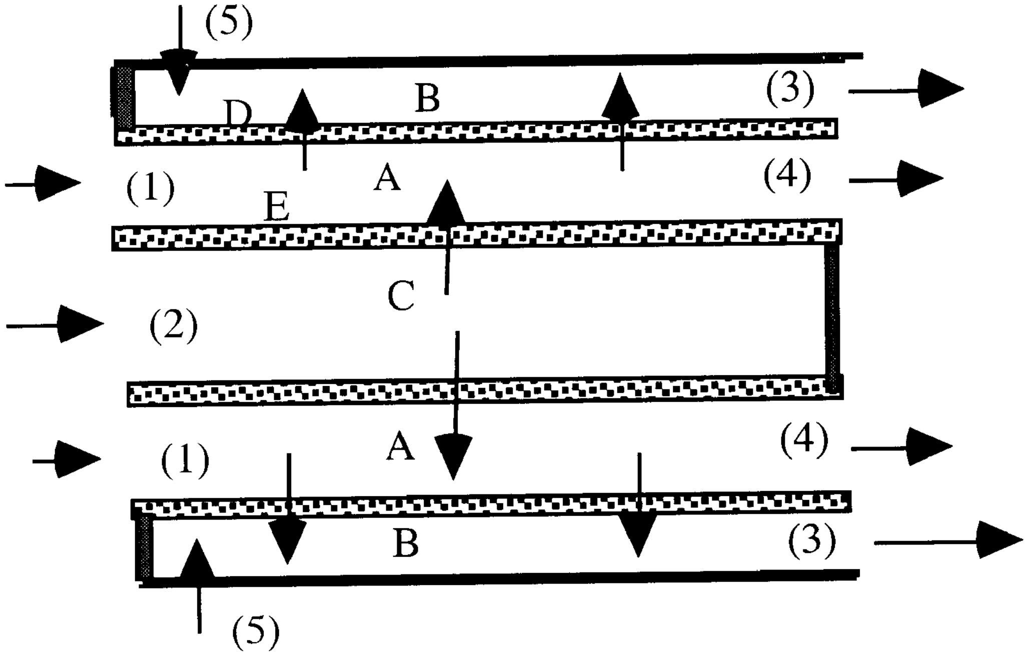
FIG. 1 is a diagrammatic representation of one configuration of the reactor. The slurry is fed into annulus A at position 1. Liquid or steam may be forced into tube C at position 2 and from tube C through a porous wall E into annulus A. The slurry is compressed by an auger, or other means, so a to squeeze water out of the slurry as it proceeds through annulus A. Liquid from the slurry flows through porous wall D into annulus B where the reaction is quenched. Liquid products exit through 3; remaining slurry exits through 4. It may be desirable to add a liquid containing chemicals at 5 in order to chemically quench the reaction.

In FIG. 1 there is shown a system for producing a product, such as sugars, from a two phase mixture, typically a liquid-solid mixture, which introduced to the system at 1, at the entrance of Annulus A. This slurry of biomass chips is conveyed horizontally through Annulus A by a auger, or some other means, through a restriction at 4. The auger, if employed, fits tightly against the inside of Porous Wall D, and scrapes the wall as it turns, thus removing solids from the wall. Liquid is introduced at 2, at the entrance of Tube C, at a pressure higher than the pressure in Annulus A. Thus, this liquid flows through Porous Wall E into Annulus A. The liquid entering at 2 may be preheated; its temperature may be controlled as it flows through Tub C by heaters or steam injector(s) placed inside Tube C. Thus the temperature of the liquid in C can be caused to increase as it flows through the reactor; since some of this liquid flows through Wall E, the temperature of the slurry in A can also be increased as it flows through the reactor. The liquid entering at 2 may also contain catalysts, e.g., an acid, solvents, or other chemicals, thereby affecting the chemical composition and the reaction(s) in A.

The slurry entering at 1 may contain a catalyst, such as sulfuric acid and it may be preheated. As the slurry flows through Annulus A, a portion of the solids is liquefied. Due to the compression of the slurry, some of the liquid in Annulus A is forced into Annulus B. This transfers some of the soluble products from Annulus A to Annulus B. This removal of soluble products, such as sugars, from A to B is furthered by the liquid entering A from C. In addition to temperature control, the introduction of liquid, from C into A, provides a means for quickly removing the soluble products from the slurry, where they are formed, in a radical direction which is much shorter than the axial dimension of the reactor. This is done in order to minimize the decomposition of desirable soluble products formed in the reaction. This movement of the liquid in the radial direction in order to reduce the residence time of the soluble products, is a principal feature of the invention.

Figure 3:
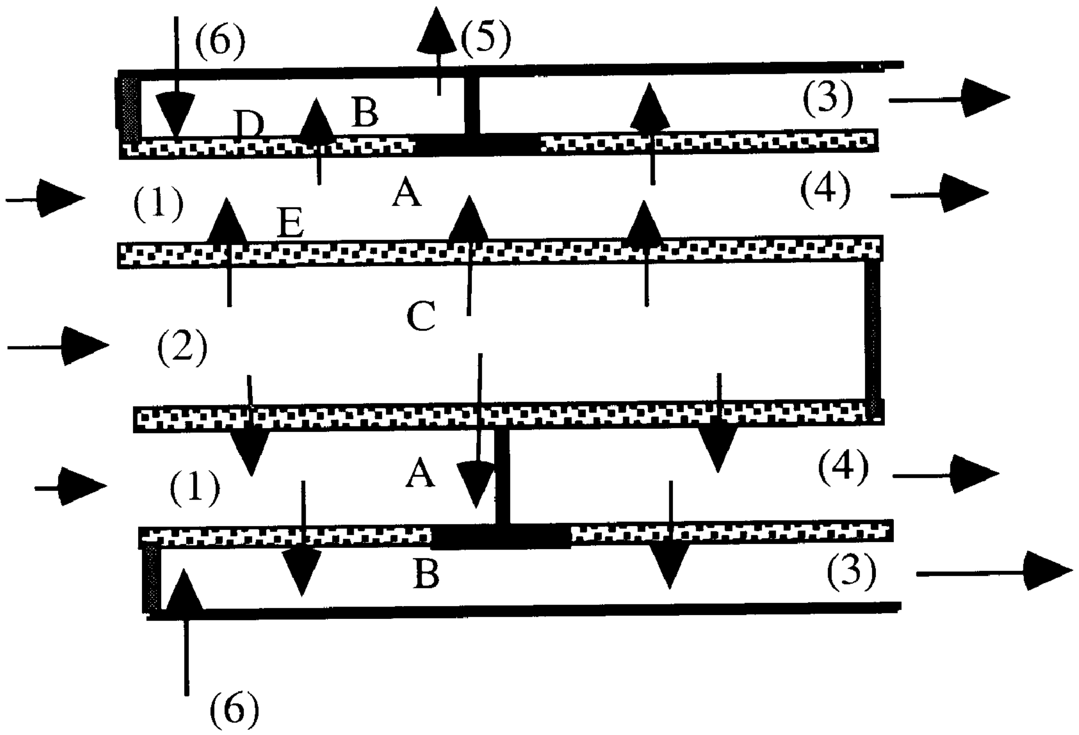
FIG. 3 shows a variation of FIG. 1 in which wall D has non-porous as well as porous sections, and annulus B has a partition so the various soluble products, such as xylose and glucose, can be separated. One product would be withdrawn through 5 and the other through 3. It may be desirable to add a liquid containing chemicals at 6 in order to chemically quench the reaction.

Annulus B is maintained at a lower pressure than Annulus A; hence, some of the liquid entering Annulus B from A, flashes, reducing the temperature abruptly and quenching the reactions. This flashing also increases the concentration of soluble products in the liquid in B. It may be desirable to feed liquid containing chemicals into B at 5; for example, it may be desirable to add a base in this stream in order to neutralize an acid catalyst present in the liquid coming from A. In the application of this system to the hydrolysis of biomass, the liquid in B contains soluble sugars. In the case where it is desirable to separate sugars formed from the hemicellulose from those formed from cellulose, at higher temperatures further down the reactor, partitions are be placed in Annulus B, as shown in FIG. 3, to at least partially separate the two products streams. This is just one example of how the system could be used to separate various products, such as proteins in addition to carbohydrates, in the refining of biomass.

A tendency of Porous Wall D to plug up with solids could be partially offset by the scraping action of the auger, if used. It could also be offset by periodically increasing the pressure in Annulus B for a brief period of time which would back-flush the porous wall, D.

In order to further the solids washing action of the liquid entering A from C, the auger may be shaped to cause regions where the liquid fraction in the slurry increases, followed by regions where it is again decreased in order to squeeze out the liquid which contains the soluble product.

Soluble products exit the reactor at 3, or, in the case that partitions are installed in Annulus B, at various points from Annulus B. The remaining solids exit from 4.

This reactor system could also be modified to use different liquids at different points in the reactor by installing partitions in Tube C. It would thus be quite generally useful in the refining of wood. If delignifying solvents were used, the remaining solids (e.g., paper pulp) would be a valuable product.

Extension I

Tube C contains a partition so that at least the initial portion can be filled with steam rather than a liquid. In this case steam flows through the porous wall, E, and condenses in Annulus A. This has the advantage in that the high latent heat of the steam conveys much more heat into A per kg of added fluid; hence, for a given temperature increase, the dilution of the material in A would be much less. Hence the concentration of the soluble product would be greater. In some cases it may be desirable to fill the entire of Tube C with steam.

Extension II

Figure 2:
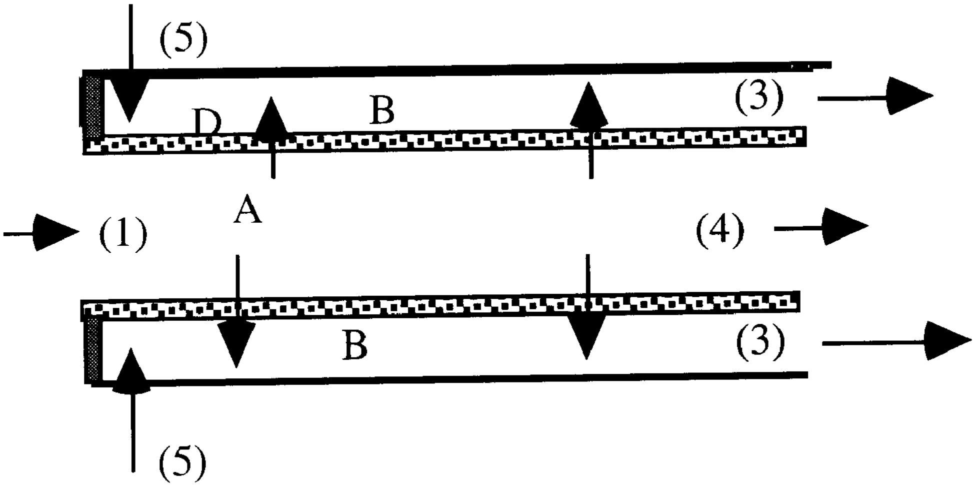
FIG. 2 shows a variation of FIG. 1 in which tube C has been removed, creating tube A and leaving annulus B. Slurry enters A at 1 and is forced through tube A. As it reacts, some of the solids are converted to liquids. The excess liquids are forced through the porous wall D into annulus B. Liquid products exit through 3; remaining slurry exits through 4. It may be desirable to add a liquid containing chemicals at 5 in order to chemically quench the reaction.

As shown in FIG. 2 there is only one annular region, B. The liquid that flows into Annulus B is that expressed due to the liquefying reaction and the compression of the solids in A . Unlike in FIG. 1, this liquid is not diluted by liquid being added to C. This would increase the concentration of the soluble product, but at the expense of yield since the soluble product would no longer be washed from the solids that remain in A. The simulated performance of this configuration is presented in Example 5 below.

Extension III

Combined counter-current and radial flows. By introducing liquid near the outlet of Annulus A and making part of the wall, D, non-porous it would be possible to have counter-current flow in the right and end of Annulus A. This flow could then be withdrawn at the upper portion of the reactor where a porous outer wall would be used in Annulus A. This could be combined with a non-porous section in the upper portion of Annulus A to permit withdrawal of the soluble products at the desired region. As shown in FIG. 3 the use of alternating sections of porous and non-porous sections of the outer wall of Annulus A would allow separate product streams to be withdrawn; hence biomass might be fractionated into a number of products (e.g., lignin, glucose, xylose, proteins). FIG. 3 is drawn to demonstrate the withdrawal of two product streams; the concept could be extended to more than two product streams, or only one, if desired.

Extension IV

To control the flow rate between Annulus A and B, a second porous pipe section is installed so that it covers the porous section in the outer wall of Annulus A. When rotated so that the pores (holes) match up, the flow is greater; when rotated so that there is a mismatch so that the hole in one is blocked, at least partially, by the solid portion in the other, the flow is reduced.

Extension V

The fluid fed through tube C into annulus A is immiscible with water. This would still produce a high yield since the sugar is swept from the annulus A into annulus B where the reaction is quenched. However, this modification would also produce a high concentration since the sugars would be extracted into the aqueous portion and would not be diluted. This principle was patented in the context of a co-current plug flow reactor (U.S. Pat. No. 4,556,430). Here it is extended to a cross-current radial flow reactor.

EXAMPLES

The following is based on computer simulations. The corresponding theory is presented in an unpublished paper, Simulation of a Cross-Flow Shrinking-Bed Reactor for the Hydrolysis of Lignocellulosics by A. O. Converse, which is attached[13].

In all simulations the biomass composition was: 41% glucan, 5% fast glucan (which is converted instantaneously) 24% xylan and 30% inerts, and the values for the 'kinetic constants' are computed from the following equations: ($C_a$ is in weight % acid.)

Cellulose to glucose (Grethlein and Converse, 1982)

$$k_c = 5.39e22 * C_a^{1.55} * \exp\left(\frac{-47100}{1.987 * T}\right)\text{hr}^{-1}$$
$$= 461 \text{ at } 240° \text{ C. and } 1\% \text{ acid}$$

Glucose to hmf (Grethlein and Converse, 1982)

$$k_g = 2.38e11 * C_a^{0.569} * \exp\left(\frac{-21000}{1.987 * T}\right)\text{hr}^{-1}$$
$$= 268 \text{ at } 240° \text{ C. and } 1\% \text{ acid}$$

Hemicellulose to xylose (Kwarteng, 1983; and Converse et al., 1989)

$$k_h = 3.74e15 * C_a^{1.17} * \exp\left(\frac{-27827}{1.987 * T}\right)\text{hr}^{-1}$$
$$= 5{,}220 \text{ at } 240° \text{ C. and } 1\% \text{ acid}$$

Xylose to furfural (Kwarteng, 1983; and Converse et al., 1989)

$$k_x = 1.40e14 * C_a^{0.688} * \exp\left(\frac{-27130}{1.987 * T}\right)\text{hr}^{-1}$$
$$= 385 \text{ at } 240° \text{ C. and } 1\% \text{ acid}$$

Dissolution of half of the inserts:

$k_I$=300 (a dummy value)

Simulation Results

Example 1

The plug flow results in Table 1 are typical of what has been predicted and obtained. Values close to 60% yield require 1% acid and 260° C. These results are presented here to provide a check on the simulation program, and for comparison with Table 2. The concentrations presented in Table 1 are those that exist when the corresponding yield is maximum. They both could not be obtained in a single plug-flow reactor.

Example 2

Simulations of an ideal cross flow reactor are presented in Table 2. Through out Table 2 the flow of liquid per unit reactor length from Tube C to Annulus A is given by Rww*(Cg+Cx). Table 2a presents results at 240° C. At this temperature and the indicated flow rate, the reactor is short, 0.1 m. As the cross-flow wash rate, Rww, is increased, the sugar yield increases but the sugar concentration decreases, as expected. The results are sensitive to the ratio of occluded water to solids, Rws. All the runs show reasonably high concentrations and yields in excess of 80%.

Example 3

Table 2b presents results at 200° C. At this temperature and the indicated flow rate, the reactor is 3 m. In run 8 the yields are good but the concentrations are low because the washing rate per unit reactor length is still high and the reactor is 30 times longer than in Table 2a. As shown in Run 9, the concentrations can be increased but still fall short of what is desired, while the yields fall below what is desired.

Example 4

Table 2c presents results at 200° C. in a short, 0.3 m, reactor, as might be the case in a pretreatment reactor. Only the xylose results are shown because most of the glucan has been remains unconverted. Comparison with Row 1 in Table 1 indicates that the cross flow reactor can obtain a higher yield than the plug flow reactor but at a lower concentration.

Example 5

Table 2d presents the results when there is no wash water introduced, but free liquid (i.e. not occluded) is able to escape through the outer porous wall. The yields and concentrations in Table 2d are at the position where the combined yield, of glucose or xylose in the sidestream and in the main axial flow are at their combined maximum values for each of the two sugars. Compared to the plug flow reactor (Table 1) both the yields and concentrations are higher. This comparison clearly demonstrates the advantage of a 'shrinking-bed' reactor in which excess liquid is removed as soon as possible

TABLE 1

Simulation Results for Plug Flow - Glucose and Xylose from Mixed Hardwood
(Rws = ratio of occluded water to solids in the slurry)

| Length | Temp | Acid | | Maximum Yield, % | | Concentration, g/L at Max. Yield | | |
|---|---|---|---|---|---|---|---|---|
| m | C. | % | Rws | Glucose | Xylose | G | X | Program |
| 3 | 200 | 1 | 2 | 12 | 77 | 25 | 90 | CFR28 |
| 3 | 200 | 1 | 10 | 13 | 80 | 6.6 | 21 | " |
| 0.3 | 240 | 1 | 2 | 44 | 78 | 85 | 89 | " |
| 0.3 | 240 | 1 | 10 | 46 | 81 | 22 | 21 | " |
| 0.1 | 260 | 1 | 2 | 63 | 79 | 117 | 87 | " |
| 0.1 | 260 | 1 | 10 | 65 | 81 | 31 | 21 | " |

Table 2 Simulation Results for Cross Flow—
Glucose and Xylose from Mixed Hardwood TABLE 2a (Reactor length, L = 0.1 m.)

| Run # | Rww $m^2h^{-1}$ | Rws | T ° C. | Yg % | Yx % | $C_{gss}$ g/L | $C_{xss}$ g/L | $C_{gss}$ + $C_{xss}$ | Program | Date |
|---|---|---|---|---|---|---|---|---|---|---|
| 1 | 3000 | 2 | 240 | 86 | 89 | 36 | 35 | 71 | CFR26 | Dec. 27, 2000 |
| 2 | " | 3 | " | 83 | 87 | 31 | 30 | 61 | " | " |
| 3 | " | 1 | " | 88 | 91 | 47 | 45 | 92 | " | " |
| 4 | 2000 | 2 | " | 83 | 87 | 43 | 42 | 85 | " | " |
| 5 | 4000 | " | " | 87 | 90 | 32 | 31 | 62 | " | " |
| 6 | " | 1 | " | 89 | 92 | 41 | 39 | 80 | " | " |
| 7 | 400 | 2 | " | 69 | 73 | 76 | 75 | 151 | " | " |

(Inlet solids flow, $M_s(0)$ = 1000 kg/hr.; Cross-section area, A = 0.1 $m^2$; Density, ρ = 1000 kg/$m^3$; Acid concentration, $C_a$ = 1%)
(Rww = wash water addition constant, $m^2h^{-1}$(The flow of liquid per unit reactor length from Tube C to Annulus A is given by Rww*(Cg + Cx)); Rws = ratio of occluded water to solids in the slurry; Yg = glucose yield, % ; Yx = xylose yield, %; Cgss = concentration of glucose in the product withdrawn fromAnnulus B at position 3, g/L; Cxss = concentration of xylose at the same location; Cgss + Cxss = total sugar concentration, g/L.

TABLE 2b (Reactor length, L = 3.0 m.)

| Run # | Rww $m^2h^{-1}$ | Rws | T | Yg ° C. | Yx % | $C_{gss}$ % | $C_{xss}$ g/L | $C_{gss}$ + $C_{xss}$ | Program | Date |
|---|---|---|---|---|---|---|---|---|---|---|
| 8 | 4000 | 2 | 200 | 83 | 96 | 5.7 | 6.1 | 12 | CFR27 | Dec. 29, 2000 |
| 9 | 400 | " | " | 60 | 87 | 14.7 | 19.6 | 24 | " | " |

TABLE 2c (Reactor length, L = 0.3 m.)

| Run # | Rww $m^2h^{-1}$ | Rws | T | Yg ° C. | Yx % | $C_{gss}$ % | $C_{xss}$ g/L | $C_{gss}$ + g/L | Program | Date |
|---|---|---|---|---|---|---|---|---|---|---|
| 10 | 4000 | 2 | 200 | | 96 | | 24 | | CFR27 | Dec. 29, 2000 |
| 11 | 400 | " | " | | 85 | | 67 | | " | " |

($M_s(0)$ = 1000 kg/hr., A = 0.1 $m^2$, L = 0.3 m, T = 200° C., ρ = 1000 kg/$m^3$, $C_a$ = 1)

TABLE 2d (Rww, wash liquid rate = 0)

| Run # | Rws | T ° C. | Ygo % | Lgo m | Cgo g/L | Yxo % | Lxo m | Cxo g/L | Program | Date |
|---|---|---|---|---|---|---|---|---|---|---|
| 12 | 2 | 240 | 55 | 0.037 | 137 | 79 | 0.0104 | 204 | CFR30 | Jan. 22, 2001 |
| 13 | 10 | 240 | 62 | 0.148 | 30 | 83 | 0.0412 | 42 | " | " |

TABLE 2d-continued (Rww, wash liquid rate = 0)

| Run # | Rws | T ° C. | Ygo % | Lgo m | Cgo g/L | Yxo % | Lxo m | Cxo g/L | Program | Date |
|---|---|---|---|---|---|---|---|---|---|---|
| 14 | 2 | 260 | 77 | 0.0087 | 191 | 81 | 0.0036 | 208 | " | " |
| 15 | 10 | 260 | 83 | 0.0343 | 40 | 84 | 0.0142 | 42 | " | " |

(Lgo = reactor length at which the sum of glucose in Annulus A and the glucose in Annulus B is maximum; Lxo = reactor length at which the sum of xylose in Annulus A and the xylose in Annulus B is maximum; Cgo = concentration of glucose in the mixture of the two streams at Lgo, g/L; Cxo = concentration of xylose in themixture of the two streams at Lxo, g/L

What is claimed is:

1. A process in which a solid reactant in an aqueous slurry is converted chemically into a soluble, decomposable product(s), and in which a portion of liquid containing said product is withdrawn through a perforated wall, in a direction approximately perpendicular to the direction in which the slurry flows, and quenched to stop the reaction.

2. The process of claim 1, wherein the slurry is conveyed through a cylindrical tube and the liquid containing said product is withdrawn through pores or ports in the wall of the tube into an annular section in which the reaction is quenched.

3. The process of claim 1, in which the slurry is conveyed through an inner cylindrical annulus and the liquid containing said product is withdrawn through pores or ports in the outer wall of said inner annulus into an outer annulus where the reaction is quenched and, in which a liquid at a controlled temperature is forced into the inner annulus through pores or ports in the inner wall of the inner annulus in a radial direction, thus increasing the crossflow.

4. The process of any one of claim 1–3, wherein the solid reactant is a biomass containing cellulose and hemicellulose and, wherein the product(s) are sugars, proteins and/or lignins.

5. The process of claim 4, wherein the reaction is maintained at a temperature between 140° C. and 280° C.

6. The process of claim 5, wherein the concentration of mineral acid in the aqueous slurry is maintained at greater than zero and less than 2 weight %.

7. The process of claims 6, wherein said mineral acid is sulfuric acid.

8. The process of claim 4, wherein the product is thermally quenched.

9. The process of claim 8, wherein the product is thermally quenched by discharging it into a region at low enough pressure to cause partial flashing.

10. The process of claim 4, wherein the product is chemically quenched.

11. The process of claim 10, wherein the product is chemically quenched by addition of a base.

12. The process of claim 11, wherein the product is chemically quenched by addition of a CaOH.

13. The process of claim 4, wherein the main soluble product is $C_5$ sugars.

14. The process of claim 4, wherein $C_5$ and/or $C_6$ sugars are produced.

15. The process of claim 3, wherein the pressure in the outer annulus is raised periodically to cause backflow into the annulus in order to clean out said pores or ports in the wall.

16. The process of claim 3, wherein the pores or ports in the outer wall of the outer annulus can be adjusted to control the flow into the outer annulus.

17. The process of claim 3, wherein a non-aqueous fluid is added through the inner wall of the inner annulus in order to increase the product concentration in the aqueous phase of the withdrawn fluid.

* * * * *